US011898537B2

(12) United States Patent
Pryimak

(10) Patent No.: US 11,898,537 B2
(45) Date of Patent: Feb. 13, 2024

(54) WIND GENERATOR

(71) Applicant: Sirocco Energy, Palo Alto, CA (US)

(72) Inventor: Oleksandr Pryimak, Kyiv (UA)

(73) Assignee: Sirocco Energy, Palo Alto, CA (US)

( * ) Notice: Subject to any disclaimer, the term of this patent is extended or adjusted under 35 U.S.C. 154(b) by 0 days.

(21) Appl. No.: 17/866,709

(22) Filed: Jul. 18, 2022

(65) Prior Publication Data

US 2023/0026308 A1    Jan. 26, 2023

Related U.S. Application Data

(60) Provisional application No. 63/224,246, filed on Jul. 21, 2021.

(51) Int. Cl.
| | |
|---|---|
| *F03D 5/04* | (2006.01) |
| *F03D 7/02* | (2006.01) |
| *F03D 15/00* | (2016.01) |
| *F03D 9/11* | (2016.01) |
| *F03D 9/25* | (2016.01) |

(52) U.S. Cl.
CPC ............ *F03D 5/04* (2013.01); *F03D 7/0204* (2013.01); *F03D 7/0244* (2013.01); *F03D 9/11* (2016.05); *F03D 9/25* (2016.05); *F03D 15/00* (2016.05)

(58) Field of Classification Search
CPC . F03D 5/02; F03D 5/04; F03D 7/0204; F03D 7/0244; F03D 9/11; F03D 9/25; F03D 15/00
See application file for complete search history.

(56) References Cited

U.S. PATENT DOCUMENTS

| | | | | |
|---|---|---|---|---|
| 8,441,141 B1 * | 5/2013 | Ouellette | ............. | B63B 21/502 290/55 |
| 10,683,841 B2 * | 6/2020 | Farrant | .................... | F03D 5/04 |
| 11,493,022 B2 * | 11/2022 | Liu | ............................ | F03D 5/04 |
| 11,560,873 B1 * | 1/2023 | Gregory | ................... | F03D 3/002 |

FOREIGN PATENT DOCUMENTS

| | | | | | |
|---|---|---|---|---|---|
| WO | WO-2011085432 A1 * | 7/2011 | | ............ | F03B 17/066 |
| WO | WO-2013109007 A1 * | 7/2013 | | ............... | F03D 3/02 |

OTHER PUBLICATIONS

Machine Translation of WO 2013/109007 A1; retrieved from ESPACENET on Jun. 29, 2023 (Year: 2023).*

* cited by examiner

*Primary Examiner* — Courtney D Heinle
*Assistant Examiner* — Sang K Kim
(74) *Attorney, Agent, or Firm* — Nadya Reingand

(57) ABSTRACT

A novel lightweight high efficiency wind generator with low noise and low vibrational levels comprising a vertical mast with a rotation element mounted at the top of the mast, with a frame attached to the rotation element with its bottom, such that the rotation element provides axial rotation of the frame in the range from 0° to 360°, is disclosed. The frame comprises a three-dimensional truss frame construction with traverses, to which at least one rigid closed elliptical base is attached. The at least one elliptical base carries a guide rail with grooves, the guide rail comprises at least one pair of rollers in the grooves which can rotate and roll in the grooves along the entire closed circuit of the elliptical base. Along the entire contour of the elliptical base blades are radially fixed and arranged in one plane using carriages.

9 Claims, 15 Drawing Sheets

WIND GENERATOR

CROSS-REFERENCE TO RELATED APPLICATIONS

The present patent application claims priority to U.S. provisional application 63/224,246 filed on Jul. 21, 2021, all of which incorporated herein in its entirety.

FIELD OF THE INVENTION

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

The invention relates to mechanics and concerns designs of alternative energy sources, namely the wind turbine design—a device for converting kinetic energy of wind flow into mechanical energy of rotor rotation with its subsequent conversion into electrical energy. This invention can be applied for generating electrical energy and can be used in various fields of economic activity, for individual households, as well as in industrial power grids, at facilities remote from populated areas (hotels in the mountains, tourist centers, houses that have problems with power supply from the grid), as well as for farms where there are outages during the grain elevator operating season. One of the main features of the invention is its low noise and vibration level, which allows this wind generator to be installed near people (factories, plants, electric charging stations, shopping centers and other buildings with a high level of electricity consumption). It is also lightweight, with the design that increases its efficiency and stability of work operation.

BACKGROUND OF THE INVENTION

There is a number of wind turbine generator designs for different applications. A known wind generator, with the generator attached to a supporting element, which is installed on the rotating shaft of the generator, with blades, connecting elements, and a mast, is disclosed in Ukrainian patent for utility model No 62129, Bulletin No 15, 2011. This design of the wind turbine enables folding and unfolding of the blades and allows searching the direction of the wind flow, which leads to increasing the efficiency of upwind and downwind energy conversion. Also, this design allows maintaining stable rotor rotation of the wind turbine during changes in the direction and speed of the wind flow, while at the same time allows using this device effectively with various features of the microrelief of the Earth's surface. However, this technical solution does not allow to achieve increase of area of effective working surface of blades, reduce load on effective working surfaces of blades and reduce areas of "dead" zones of blades surfaces, as well as to simultaneously reach coefficient of wind energy conversion (CET) into electric power up to 50-55%.

Another known wind-driven generator which contains working elements that are fixed on a bearing element, namely a closed guide rail, which is installed on a shaft of the generator, with blades, rollers, connecting elements, and a mast, is disclosed in Ukrainian patent for utility model No 16097, Bulletin No 7, 2006. Such design of a wind turbine generator is aimed at improvement of operational characteristics and reliability of wind turbine operation at low and high wind speeds, but this utility model does not allow to achieve increase of blade effective working surface area, decrease of blade effective working surface load, and decrease of areas of "dead" zones of blade surfaces, with simultaneously achieving coefficient of wind energy conversion to electric power (CET) up to 50-55%.

The closest technical solution to the proposed invention is a wind turbine (wind generator) containing connecting elements, and a guiding frame in which blades connected with a chain component, are installed so that they can move and contact with at least one wheel of torque transmission to the generator, as disclosed in the Patent of Russian Federation for the invention No 2008518.

This technical solution is aimed at achieving speed stability of the wind turbine (wind turbine generator) and achieving stabilization of the internal wind flow. However, since the first row of blades of this invention overlaps ("shades") the second row of the blades, this leads to lower efficiency of the wind flow. Furthermore, the presence of at least 4 cogwheels, the diameter of which depends on the turning speed of the blades, as well as dependence of the diameter of these wheels on the force and mechanical load, leads to creation of undesired centrifugal force. In addition, given that each blade in the process of operation of the device constantly changes the angle at reversals, which affects the increase of friction and load in the places of blades mounting, and reduces the strength and durability, such constructive solution cannot achieve increase in the area of the swept effective working surface of the blades, reduce the load on the effective working surfaces of the blades and reduce the area "dead" zones of the blade surfaces, while simultaneously achieving a conversion efficiency of wind energy (EER) into electric power to 50-55%. Furthermore, this design does not allow to decrease the weight of the wind generator, decrease the load on the frame and on an ellipsoid base, decrease the coefficient of an aerodynamic resistance of the whole construction, and does not provide an ability to modify the size and power of the wind generator by adding extra sections to the existing construction.

SUMMARY OF THE INVENTION

The present invention is aimed at overcoming deficiencies of the described wind generators.

The instant wind generator has a special design with the combination of structural elements which lead to improvement of the wind generator operation that exceeded expectations. The novel construction allows increasing the area of the swept effective surface of the blades, reduction of the load on the effective working surfaces of the blades and reduction of the areas of "dead" zones of the surfaces of the blades. In addition, the instant invention allows to decrease the weight of the wind generator, to decrease the load on the frame and on an ellipsoid base, to decrease the coefficient of an aerodynamic resistance of the whole construction, and provides an ability to modify the size and power of the wind generator by adding extra sections to the existing construction.

The novel wind generator comprises a vertical mast with a rotation element mounted at the top of the mast, with a frame attached to the rotation element with its bottom such that the rotation element provides axial rotation of the frame in the range from 0° to 360°. The frame comprises a three-dimensional truss frame construction with traverses, to which at least one rigid closed elliptical base is attached. The at least one elliptical base carries a guide rail with grooves, the guide rail comprises at least one pair of rollers in the grooves which can rotate and roll in the grooves along the entire closed circuit of the elliptical base. Along the entire contour of the elliptical base blades are radially fixed and arranged in one plane using carriages, and each of the blades is made in the shape of an elongated plate having an aerodynamic asymmetrical profile. The design of the blades, the elliptic base, and all structural elements allow achieving unexpected, superb improvement of the efficiency and durability of the novel wind generator. The instant wind generator is variable in size, weight, and power.

DESCRIPTION OF THE DRAWINGS

Specification of parts.
1—elliptical base;
2—frame;
3—guide rail
4—guide rail slots
5—three-dimensional truss frame construction
6—traverse frames
7—carriages
8—carriage mounting plate
9, 10—the first pair of rollers;
11, 12—second pair of rollers
13—carriage connecting rails
14—rods for securing the connecting rails of the closed circuit
15—closed circuit of carriages and connecting rails
16—blades
17—blade holders
18—hinge connection between the blade 16 and the holder 17
19—generator block
20—generator
21—generator shaft
22—main generator pulley
23—tension pulley
24, 25—pressure rollers
26—strap
27—generator unit mounting rail
28—power electronics unit
29—generator controller power converter (inverter)
30—ballast resistance
31—control electronics unit
32—rotary controller of the control electronics unit
33—wind speed sensor
34—wind direction sensor
35—vertical mast
36—top of the mast
37—mast rotation element
38—lower part of the frame 2
39—carriage bracket
40—frequency converter of the control electronics unit
41—generator controller
42—rechargeable battery of the power electronics unit
43—rotary mechanism
44—elliptical base sections
45—frame sections
46—rotary engine
47—rotary gearbox
48—radial thrust bearing of the rotary mechanism
FIG. 1—wind generator, elliptical base 1, blades 16, rear view;
(FIGS. 8A and 8B show different views)

DETAILED DESCRIPTION OF THE INVENTION

Figure 1:
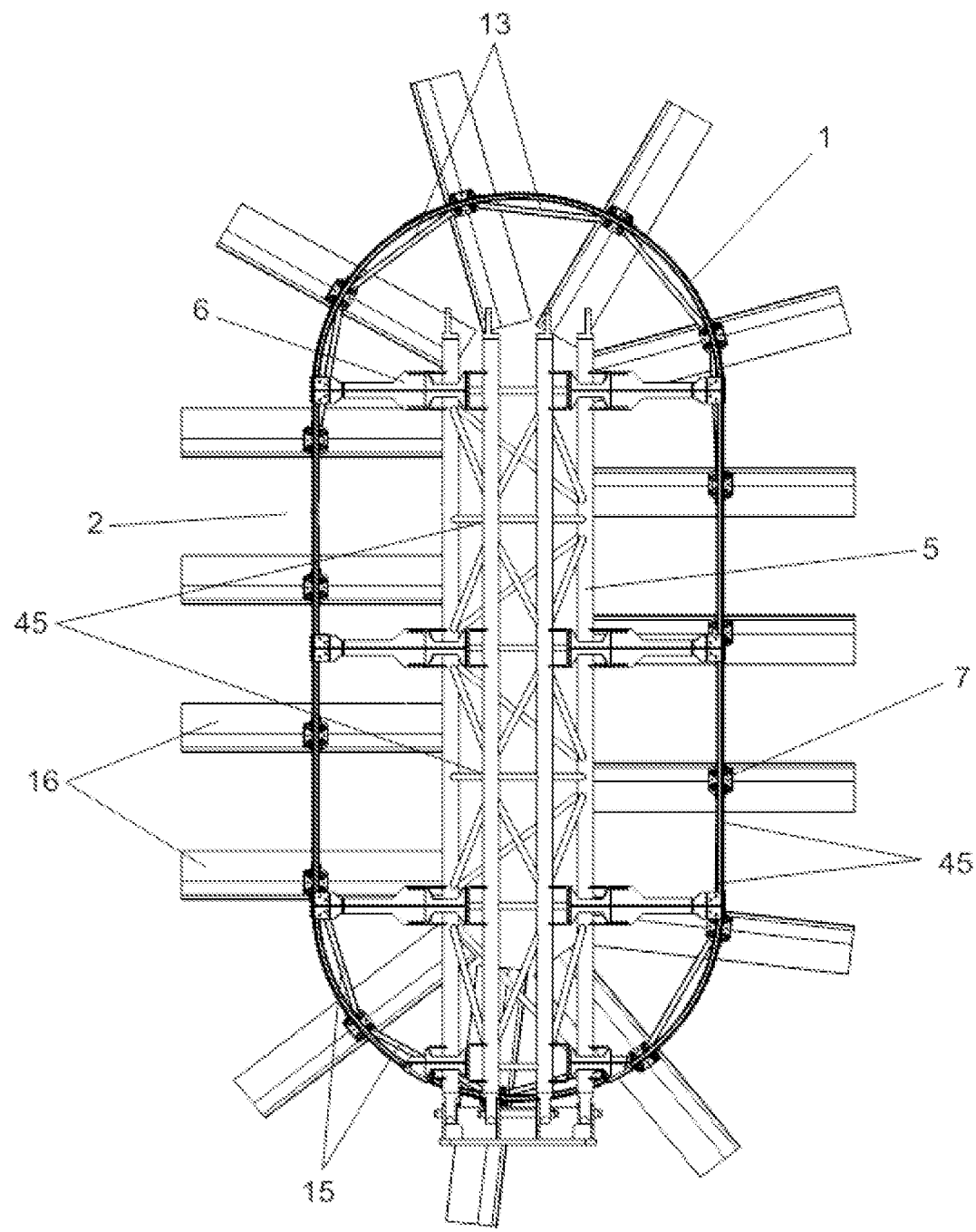

Specific embodiments will now be described in detail with reference to the accompanying figures. Like elements in the various figures are denoted by like reference numerals for consistency. In the following detailed description of embodiments, numerous specific details are set forth to provide a more thorough understanding of the invention. While described in conjunction with these embodiments, it will be understood that they are not intended to limit the disclosure to these embodiments. On the contrary, the disclosure is intended to cover alternatives, modifications, and equivalents, which may be included within the spirit and scope of the disclosure. It will be apparent to one of ordinary skill in the art that the invention can be practiced without these specific details. In other instances, well-known features have not been described in detail to avoid unnecessarily complication of the description.

According to the preferred embodiment of the present invention, the wind generator of variable size and power with improved technical features is disclosed, the wind generator comprises an increased area of effective surface of blades 16, reduced load on the effective working surfaces of the blades 16 and reduced areas of "dead" zones of the surfaces of the blades 16, decreased weight, decreased load on a frame 2 and on an elliptical base 1, decreased coefficient of an aerodynamic resistance of the whole construction. The wind generator comprises: a vertical mast 35 rigidly stabilized on the ground, a rotation element 37 mounted on the top 36 of the mast, a frame 2 mounted on the rotation element 37 with the frame lower part 38, such that the rotational element 37 provides axial rotation of the frame 2 in the range from 0° to 360°. The frame 2 comprises a three-dimensional truss frame construction 5 with traverses 6, to which at least one rigid closed elliptical base 1 is attached. The at least one elliptical base 1 carries a guide rail 3 with grooves 4, the guide rail 3 is configured for installing at least one pair of rollers 9, 10, 11, and 12 in the grooves 4 which allows their rotation and rolling in the grooves 4 along the entire closed circuit of the elliptical base 1. Along the entire contour of the elliptical base 1 the blades 16 are radially fixed and arranged in one plane using carriages 7, and each of the blades 16 is made in the shape of an elongated plate having an aerodynamic asymmetrical profile. Each of the carriages 7 is made of a bracket 39, which is connected to a mounting plate 8 on which installed at least one pair of rollers 9, 10, 11, and 12, and each of the rollers 9, 10, 11, and 12 is installed with the ability to rotate around its own axis. Holders 17 of the blades 16 are attached to the brackets 39 of the carriages 7, with the blades 16 attached in turn to the holders 17 by hinge connections 18, which allow changing an angle of inclination of the blades 16 with respect to a plane of the elliptical base 1. Each of the carriages 7 is connected to neighboring carriages 7 by connecting rails 13 and rods 14, such that all the carriages 7 connected to each other in series form a chain carriage of the carriages 7 and the connecting rails 13 as a closed circuit 15. All carriages 7 with the attached blades 16 as a part of the closed circuit 15 are installed with their own rollers 9, 10, 11, and 12 in the grooves 4 of the guide 3 elliptical base 1, which allow rotation of the closed circuit 15 with the blades 16 along the closed contour of the elliptical base 1.

The wind generator further comprises a generator block 19, comprising a generator 20 on a shaft 21 of which is placed a main pulley 22, which further comprises a tension pulley 23, pressure rollers 24, 25, and a belt 26. The generator block 19 is installed on its own mounting rail 27, which is mounted on the elliptical basis 1 such that the belt 26 alternately contacts the moving connecting rails 13 of closed circuit 15 using the pressure rollers 24, 25 during an operation of the wind generator, thus allowing to receive/transmit mechanical energy. The generator 20 has a connection via a generator controller 41 to a power unit electronics 28, which comprises at least a power converter 29 of the controller generator 41 and ballast resistance 30.

The wind generator further comprises a control electronics unit 31 based on a rotary controller 32, and a wind speed sensor 33 and a wind direction sensor 34 for data transmission to the control electronics unit 31. The control electronics unit 31 is configured to transmit control signals to the rotation element 37 to ensure the necessary location of the frame 2 of the wind generator in relation to the wind direction based on the obtained data, and for providing a halt of the wind generator when the wind speed exceeds 18 m/s.

According to another embodiment the wind generator has the elliptical base 1 which comprises more than one guide rail 3 for carriages 7, and wherein the guide rails 3 have a round or a rectangular cross-section with one or more grooves 4 for rollers 9, 10, 11, 12.

According to another embodiment the wind generator has the blades 16 which are made of any of polymeric material, composite material, aluminum or aluminum alloys, or other light metal.

According to another embodiment the wind generator has a cross-section of the vertical mast 35 which is a circle, or a polyhedral, or wherein the vertical mast 35 is a truncated cone.

According to another embodiment the wind generator has the three-dimensional truss frame construction 5 made of sections with the ability to reduce or increase vertical height of the frame 2 by dismantling or adding vertical sections 45.

According to another embodiment the wind generator has the elliptical base 1 made of sections allowing to reduce or increase the vertical height of the elliptical base 1 by dismantling or adding vertical flat sections 44.

According to another embodiment the wind generator has the control electronics unit 31 which comprises a frequency converter 40.

According to another embodiment the wind generator has the power electronics unit 28 which comprises a rechargeable battery 42.

According to another embodiment the wind generator has the rotation element 37 in the form of a rotary mechanism 43, which comprises at least a motor 46, a gearbox 47 and a radial thrust bearing 48, wherein the rotation element 37 is mounted on the top 36 of the vertical mast 35 at the junction of the frame 2 and the vertical mast 35, and wherein the motor 46 is connected to a power supply and to the rotary controller 32 of the control electronics unit 31.

The following is a more detailed description of the operation of the novel wind generation with references to Figures.

One of the main elements of the wind generator is the guiding elliptical base 1, which is made in the form of a rigid closed circuit having a shape approaching the shape of an ellipse (FIGS. 1-4). In general, the guide elliptical base 1 is made of one rigidly closed circuit of elliptical shape. Along the entire contour of the elliptical base 1, a guide rail 3 with grooves 4 (FIG. 6) is installed, which are configured to accept at least one pair of rollers 9, 10, or two pairs of rollers 9, 10, 11, and 12, which can be rotated and rolled along the entire closed contour of the elliptical base 1. In some cases, the ellipsoidal base 1 may comprise several guide rails 3 (mounted in parallel) for carriages 7, and these guide rails 3 may have a circular or rectangular cross-section (not shown in the drawings) with one or more slots 4 for rollers 9, 10, 11, and 12.

Figure 4:
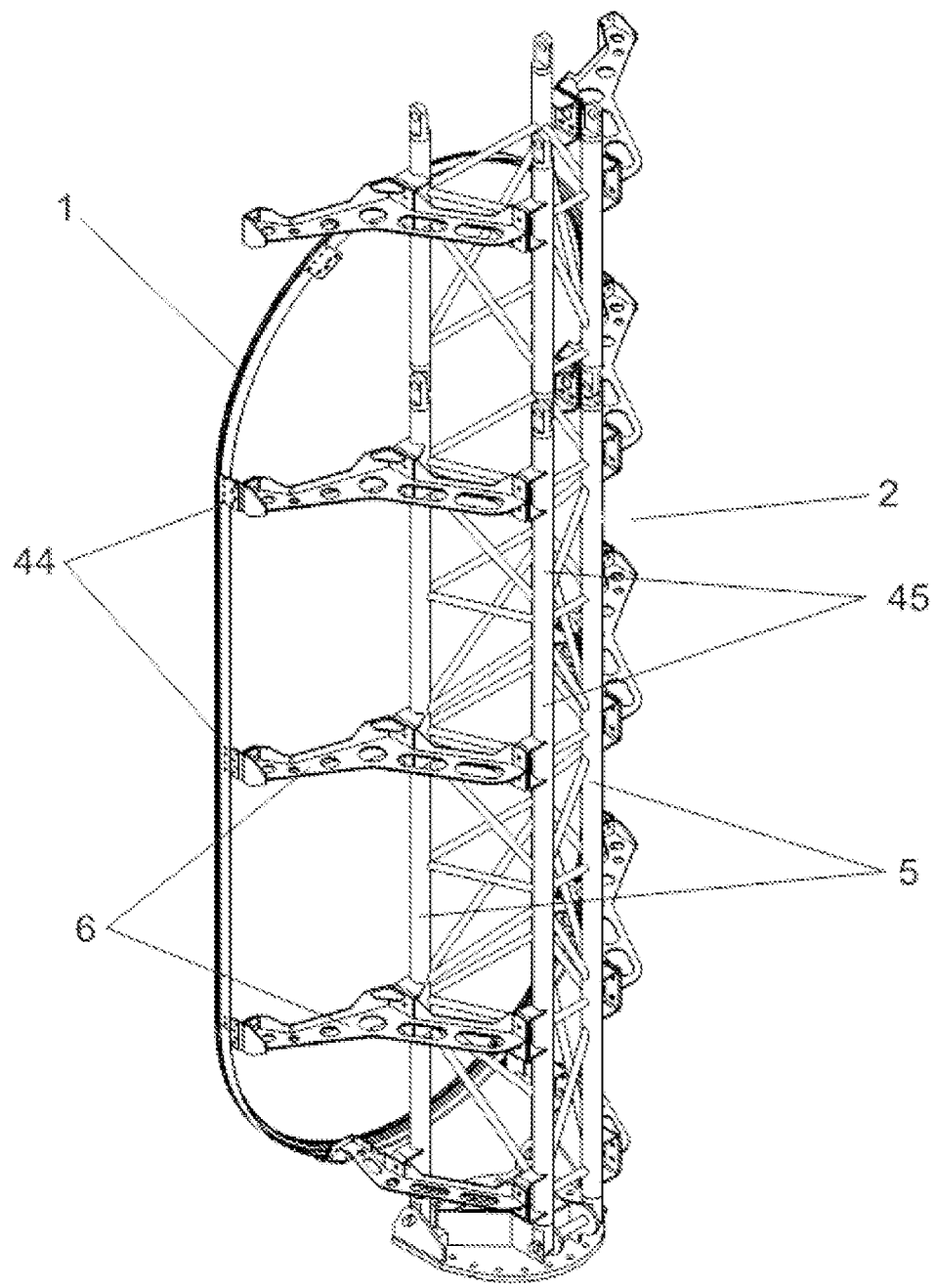
FIG. 4—elliptical base 1, frame 2, side-back view.
Figure 5:
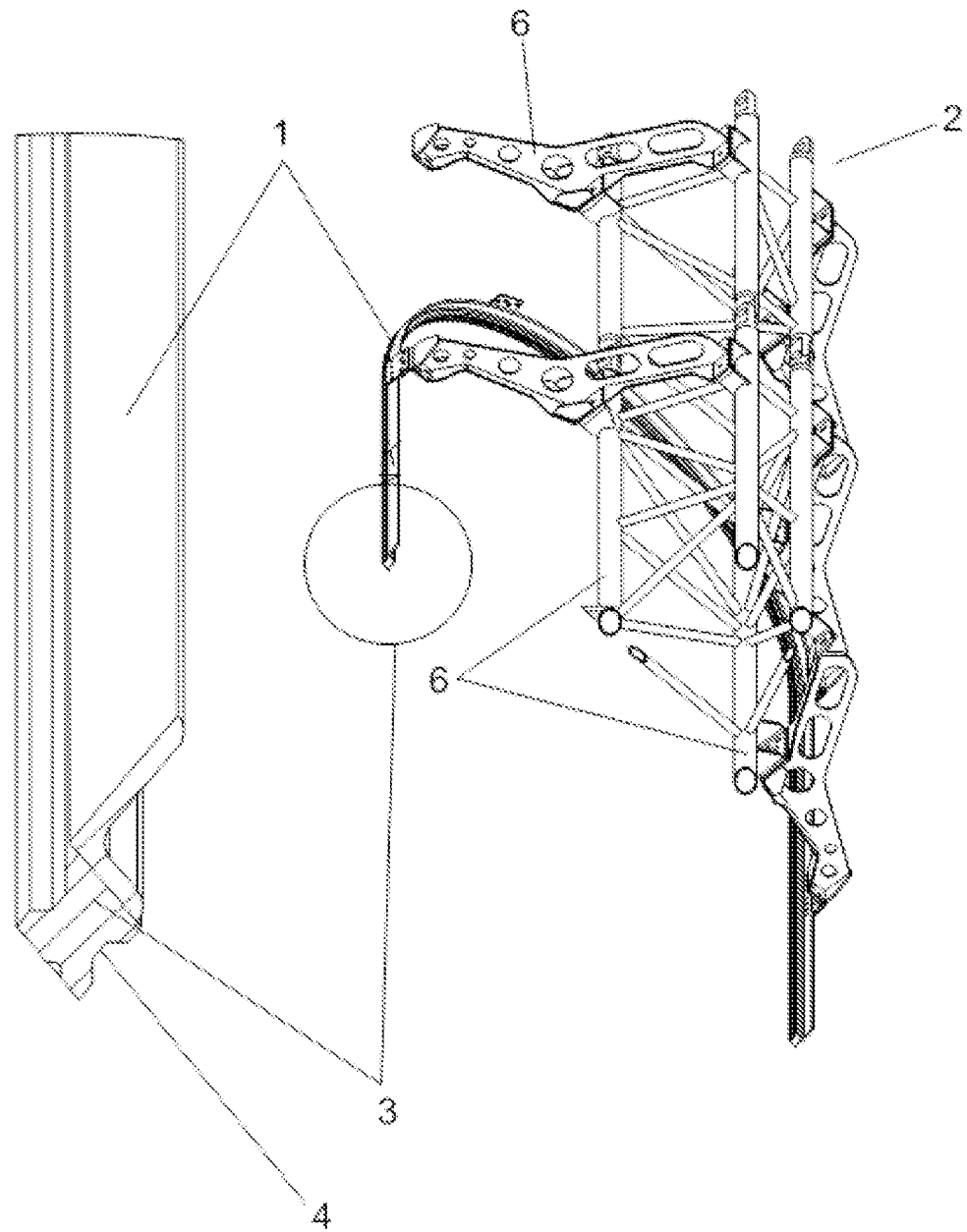
FIG. 5—guide rail 3 with guide rail slots 4.
Figure 13:
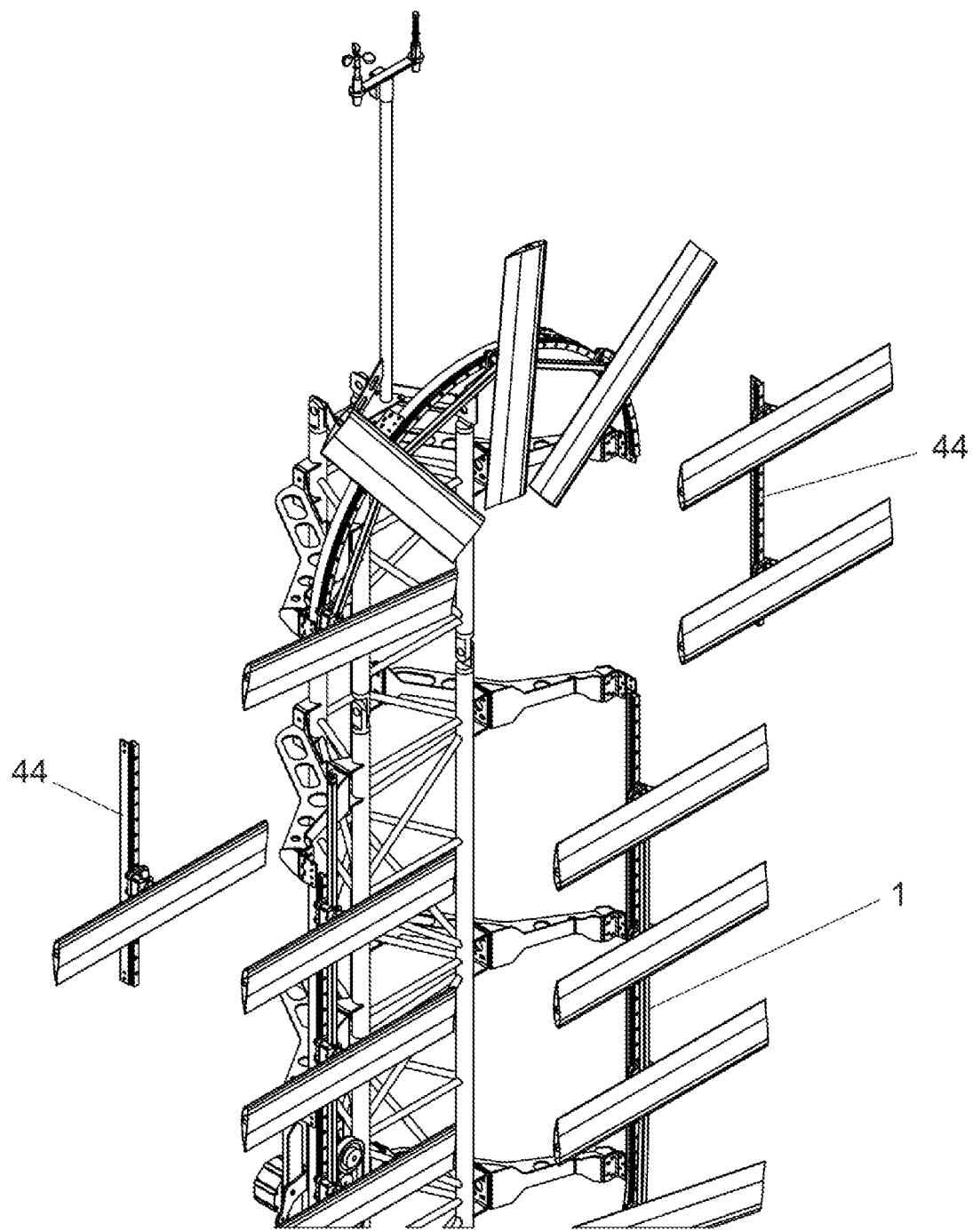
FIG. 13—elliptical base sections 44.

The elliptical base 1 may be configured to decrease or increase the vertical height of the elliptical base 1 by appropriately dismantling or adding vertical flat sections 44 (modules) of the elliptical base 1 (FIGS. 1, 4, 13). Reducing or increasing the number of sections 44 and, accordingly, changing the size of the elliptical base 1 allows to change (reduce or increase) the number of blades 16.

Behind (on the reverse side) of the elliptical base 1 are located and fixed traverses 6, which may be made of, but not limited to, metal or composite plastic (FIG. 1-5). The traverses 6 are also attached to the three-dimensional truss structure 5 of frame 2 (FIG. 1-5). In general, the frame 2 is a three-dimensional truss frame structure 5 with traverses 6 attached. The traverses 6 are symmetrically (and at a distance from each other) arranged on both sides by a three-dimensional truss frame structure 5 (FIGS. 1-4).

Figure 14:
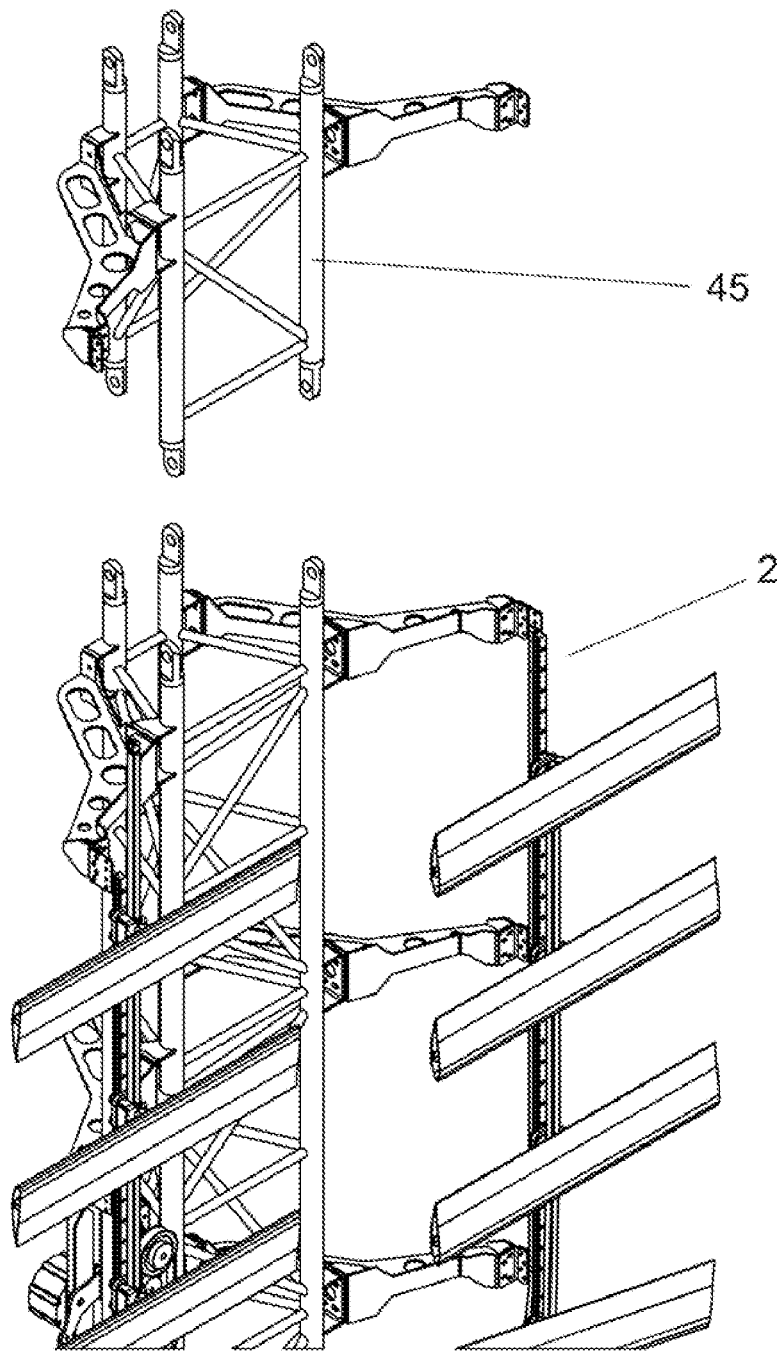
FIG. 14—frame sections 45.
Figure 15:
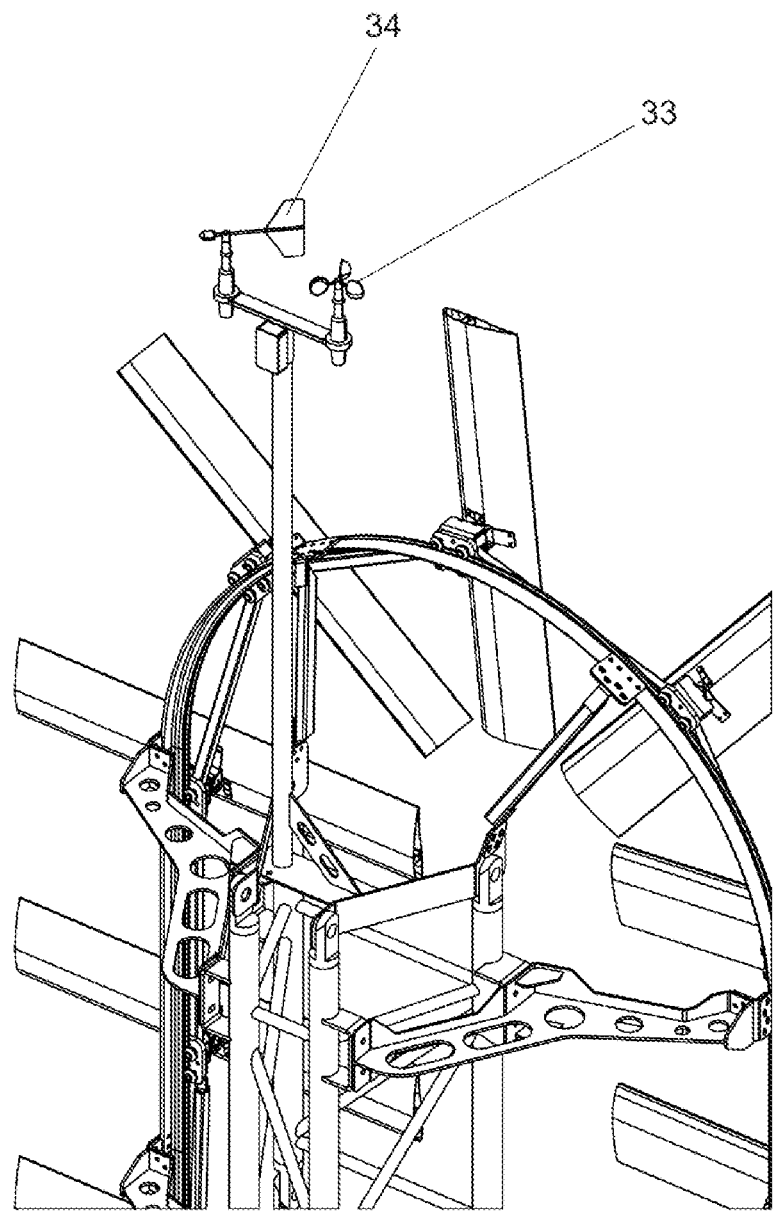
FIG. 15—wind speed sensor 33, wind direction sensor 34.

The three-dimensional truss frame structure 5 is made of, but not limited to, metal or plastic pipes. The basis of the three-dimensional truss frame structure 5 is several vertical elements (rods/pipes), which are connected and reinforced with stiffeners in the form of other rods/pipes, which are located at angles (FIGS. 1-4). The three-dimensional truss frame structure 5 of the frame 2 may be configured to decrease or increase the vertical height of the frame 2 by dismantling or adding vertical sections 45 (modules) of the frame 2 (FIGS. 1, 4, 14). Reducing or increasing the height allows to change the height of the frame 2 in accordance with the size of the elliptical base 1 and the number of blades 16.

Functionally, the frame 2 comprising the three-dimensional truss frame structure 5 with traverses 6, is intended for vertical attachment of the elliptical base 1 with mounted blades 16. The bottom 38 of the frame 2 is attached to the rotation element 37 mounted on the top 36 of the vertical mast 35 (FIG. 12), with the rotation element 37 of the vertical mast 35 allowing axial rotation of the frame 2 in the range 0° to 360°.

Figure 6:
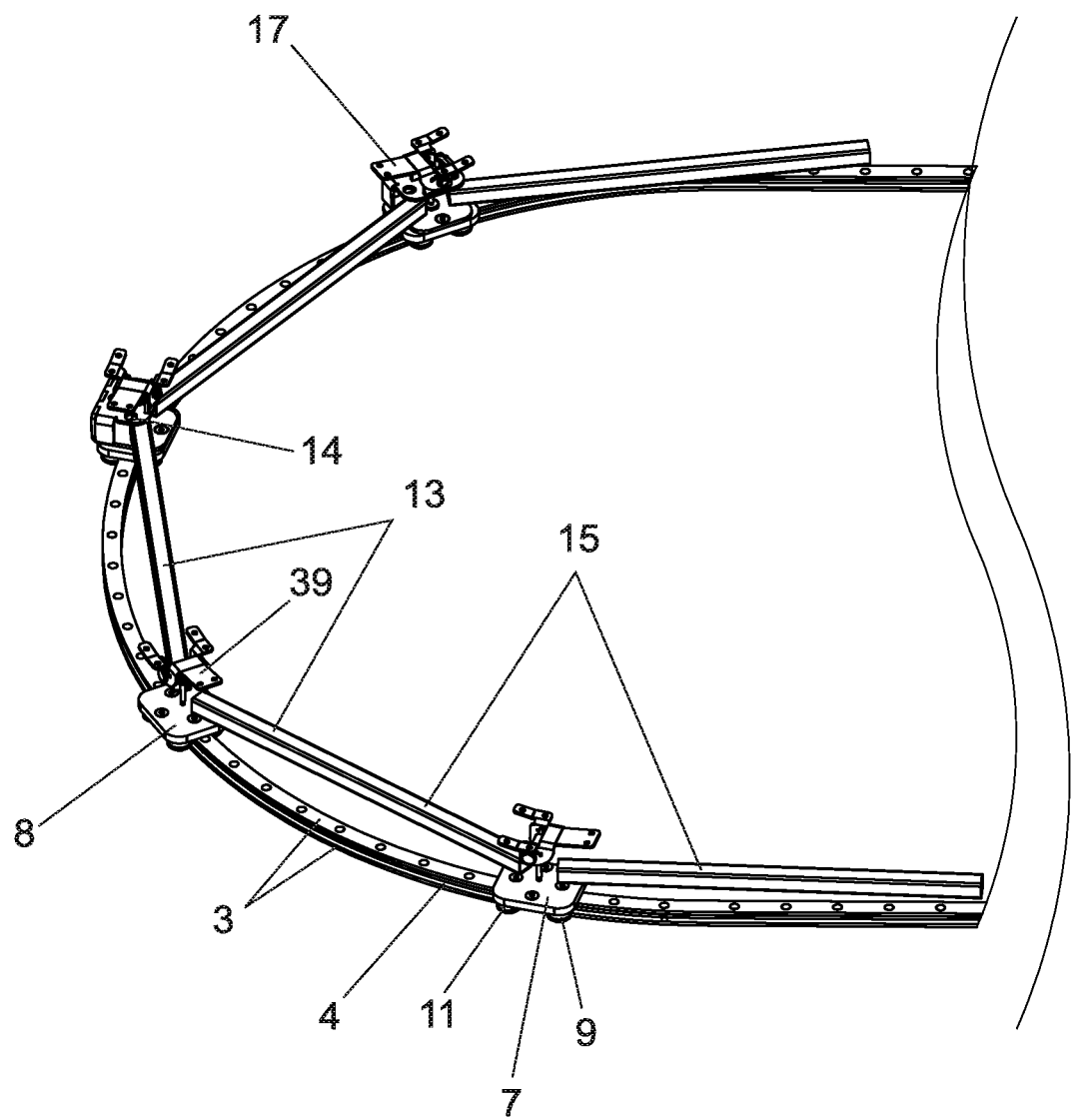
FIG. 6—fragments of elliptical base 1, frame 2, carriage connecting rails 13 of carriages 7, rods for securing the connecting rails 14, the closed circuit 15.
Figure 7:
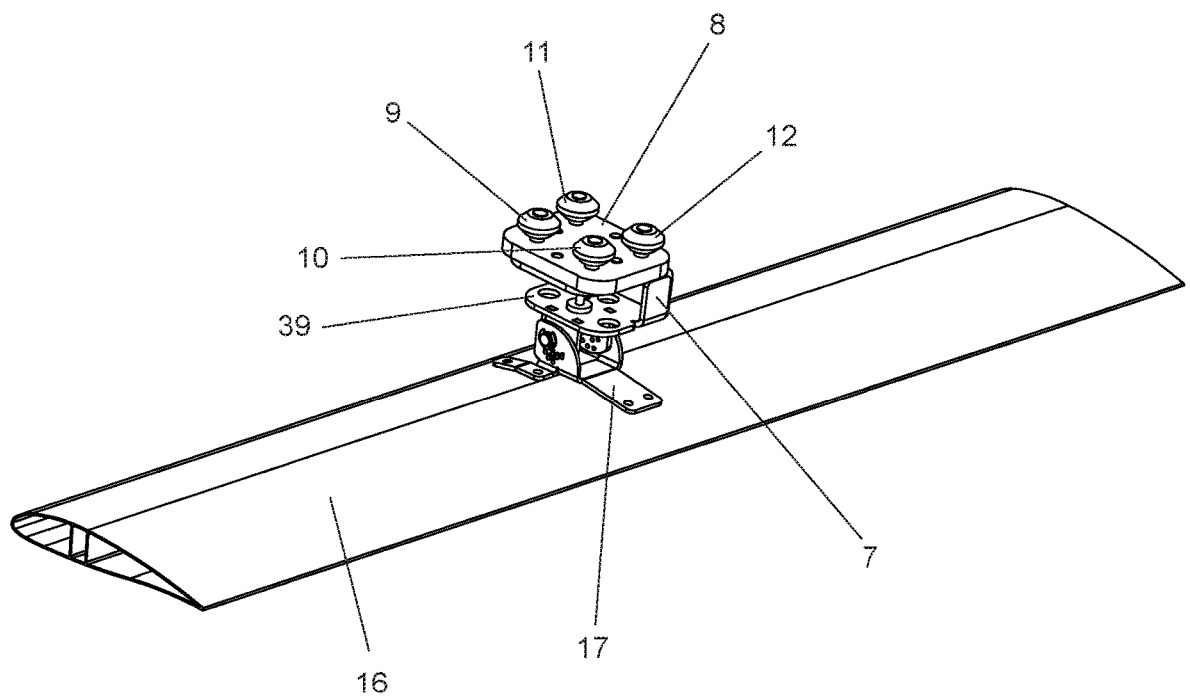
FIG. 7—blade 16 with a carriage 7.
Figure 8A:
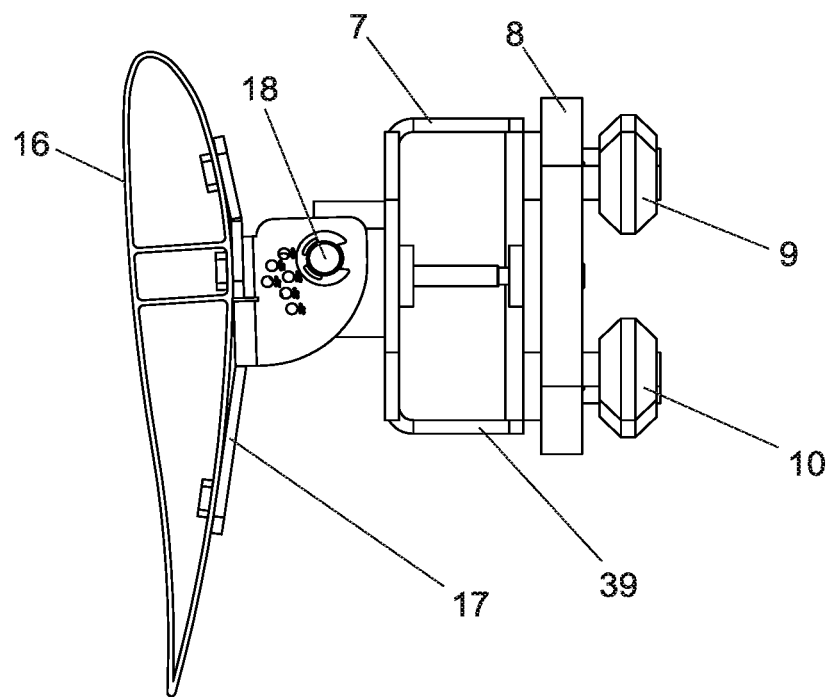
FIG. 8A-B—carriage bracket 39, blades 16, rollers 9, 10, 11, 12, blade holders 17, hinge connection between the blade 16 and the holder 17.

In the system of guide rails 3, the elliptical base 1 allows moving the carriages 7 (FIG. 6-8A-B, FIG. 1, 2). Each carriage 7 comprises a bracket 39 to which a mounting plate 8 is attached, on which at least one pair of rollers 9, 10, 11, and 12 is installed (FIG. 7, 8A-B). Each of the rollers 9, 10, 11, and 12 are capable of rotating around its own axis.

Each of the carriages 7 is connected to adjacent carriages 7 by connecting rails 13 and rods 14 (FIG. 6). At opposite ends of the connecting rails 13 there are openings for hinged joints. Each of the connecting rails 13 is disposed between two adjacent carriages 7, and each of the connecting rails 13 is attached (with an option of hinge movement) with opposite ends to the corresponding carriages 7 using its own openings and rods 14. Thus, all the carriages 7 connected in series form a chain component in the form of a closed circuit 15 of these carriages 7 and connecting racks 13 (FIG. 6, 1).

The chain 15 and, respectively, each carriage 7 (FIG. 6, 1) are installed on the elliptical base 1 so that the rollers 9, 10, 11, and 12 located in the slots 4 of the guide rail 3, or in several parallel guide rails 3, provide cyclic movement of the circuit 15 with all connected carriages 7 in the circuit 15 along the closed circuit of the elliptical base 1.

Figure 8B:
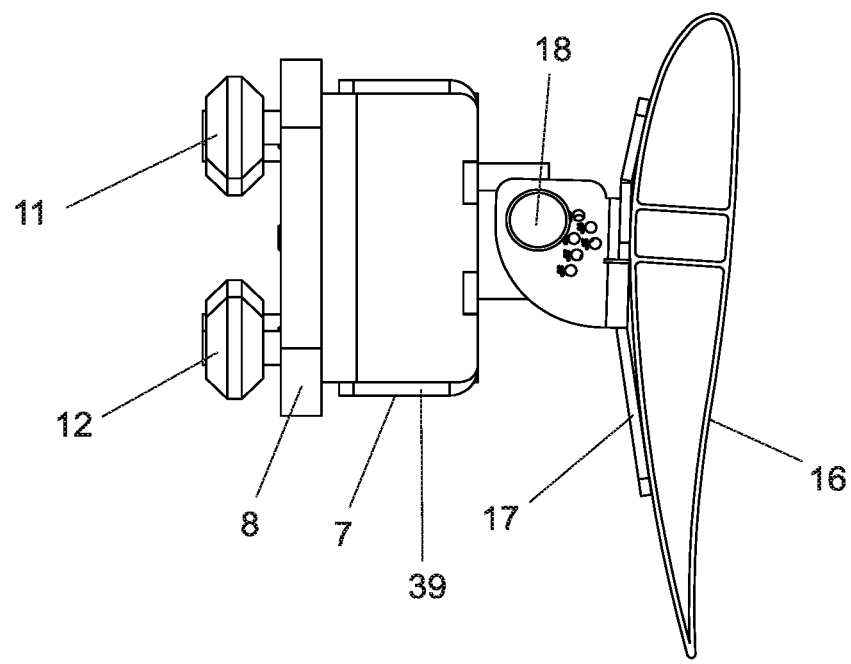

The main energy-functional elements of the wind turbine are the blades 16 (FIG. 1-2, FIG. 7-8A-B, FIG. 10-11), the number of which depends on the overall size of the structure and the required power of the wind turbine, although the minimum number is four. All blades 16 have the same structural shape and size. Each of the blades 16 is made in the form of an elongated plate having an aerodynamic asymmetric profile (FIG. 7, 8A-B). The blades 16 may be made of, but not limited to, a polymeric material, a composite material, aluminum, aluminum alloy or other light metal.

Each of the blades 16 is attached by means of a suitable holder (or several holders) 17 to one or more carriages 7 (FIG. 7, 8A-B), namely to a bracket or to brackets 39 of carriages 7. Accordingly, the blade 16 is attached to the holder 17 at one or more points by a hinge 18 that allows the angle of inclination of the blade 16 to be altered with respect to the plane of the elliptical base 1.

Furthermore, varying the width of the blades 16 and the blade density allows increasing or decreasing the power output of each wind turbine. It is also possible to create wind turbines with different nominal wind speeds, adapted to the specific operating conditions.

Figure 2:
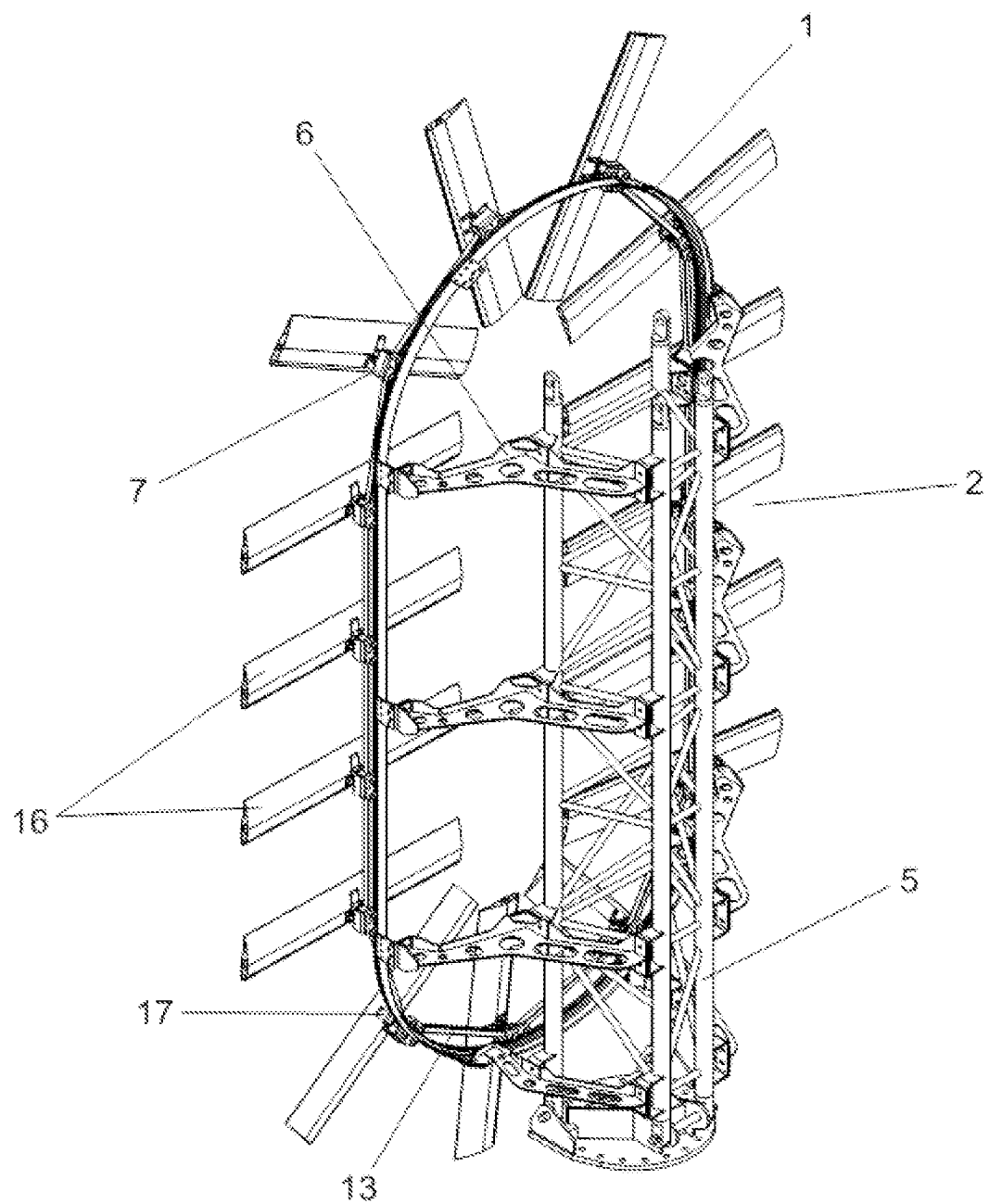
FIG. 2—wind generator, elliptical base 1, blades 16, side-back view.
Figure 3:
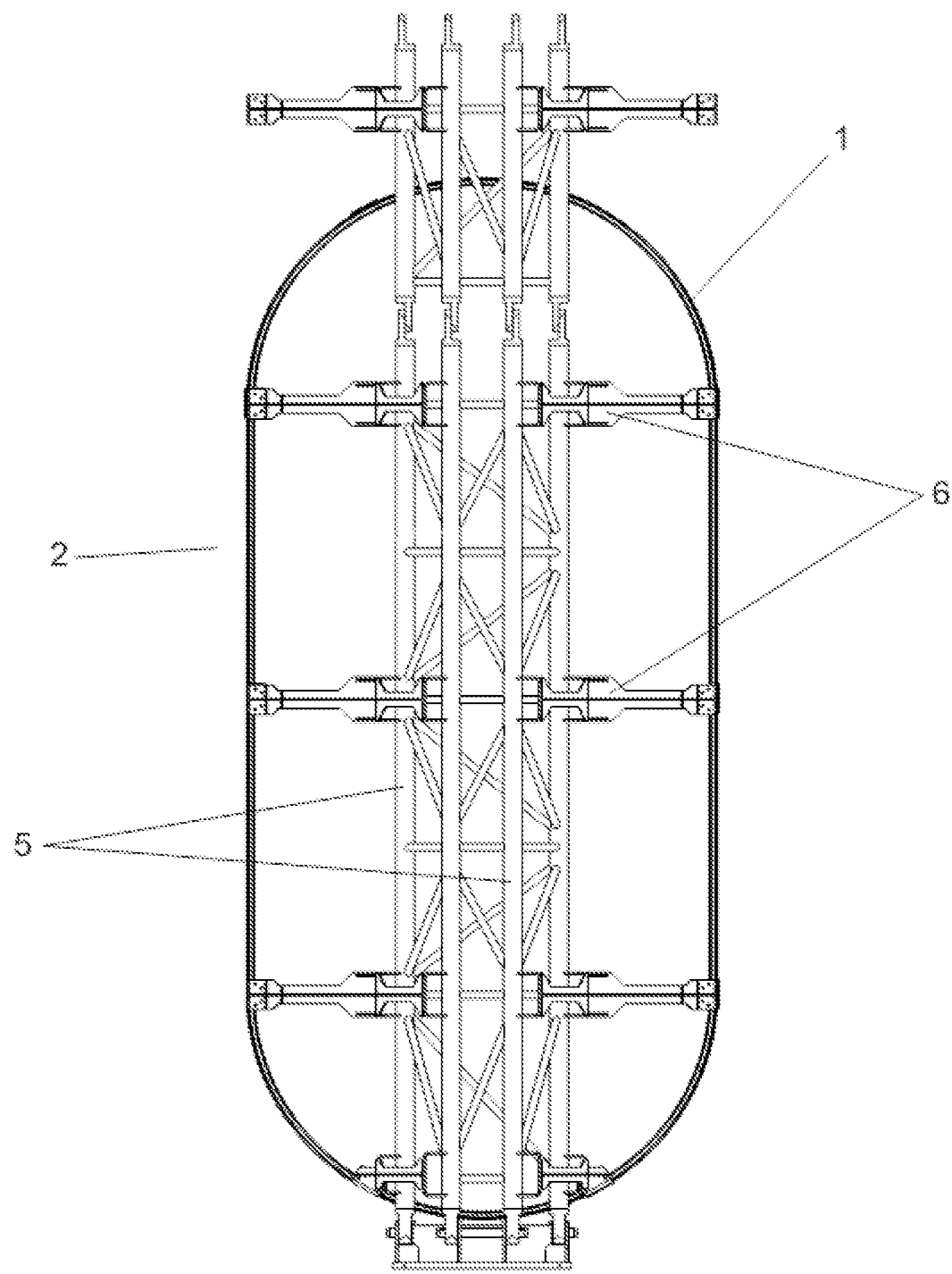
FIG. 3—elliptical base 1, frame 2, rear view.
Figure 10:
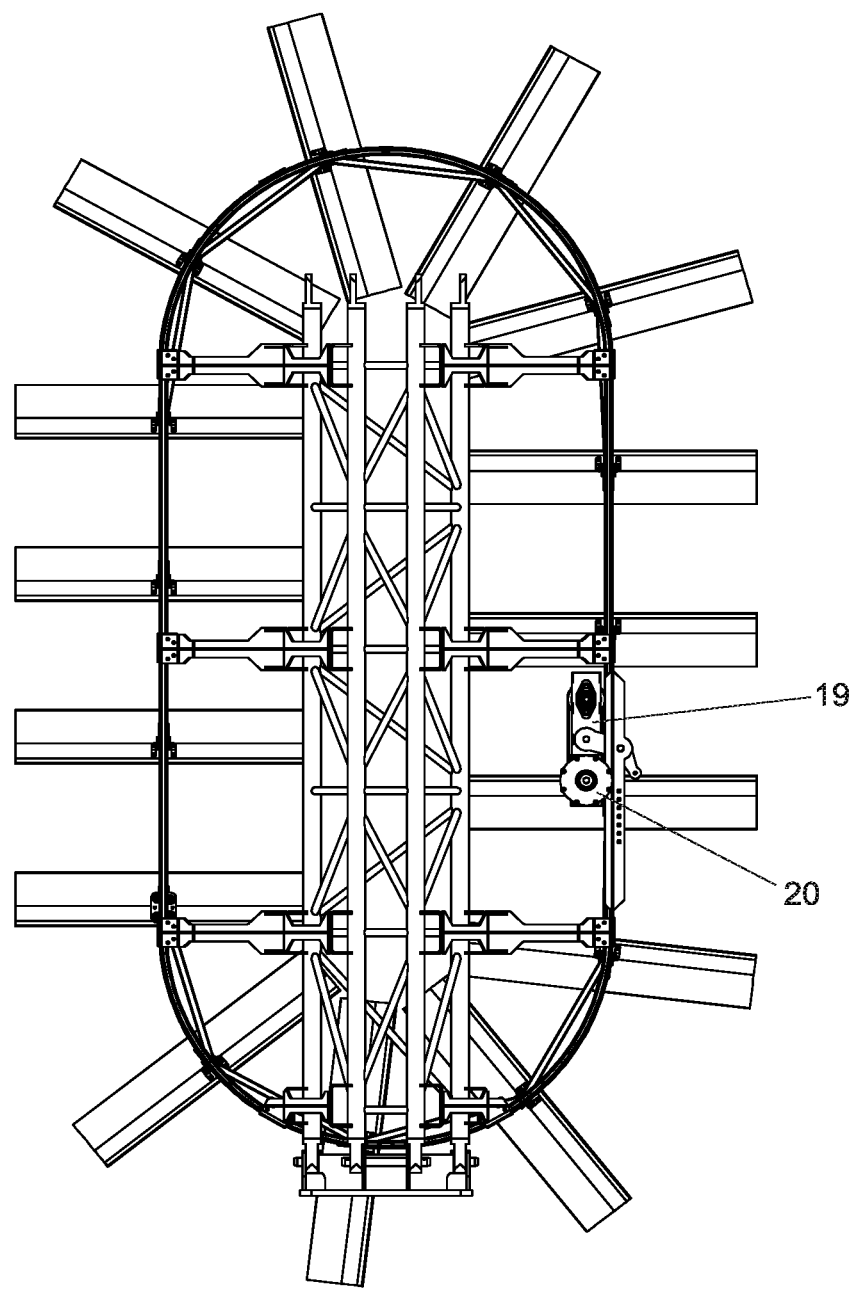
FIG. 10—generator block 19 installed on ellipse base 1.

Thus, all the blades 16 are radially fixed and arranged in the same plane throughout the ellipse guide frame 1 by the carriages 7 making them moveable (FIGS. 1, 2, 10).

The blades 16, which are mounted and fastened in the carriages 7 forming the chain 15 as a part of the ellipse guiding frame 1, form the wind base of the wind turbine generator along with all the structural elements of the frame 1.

Figure 12:
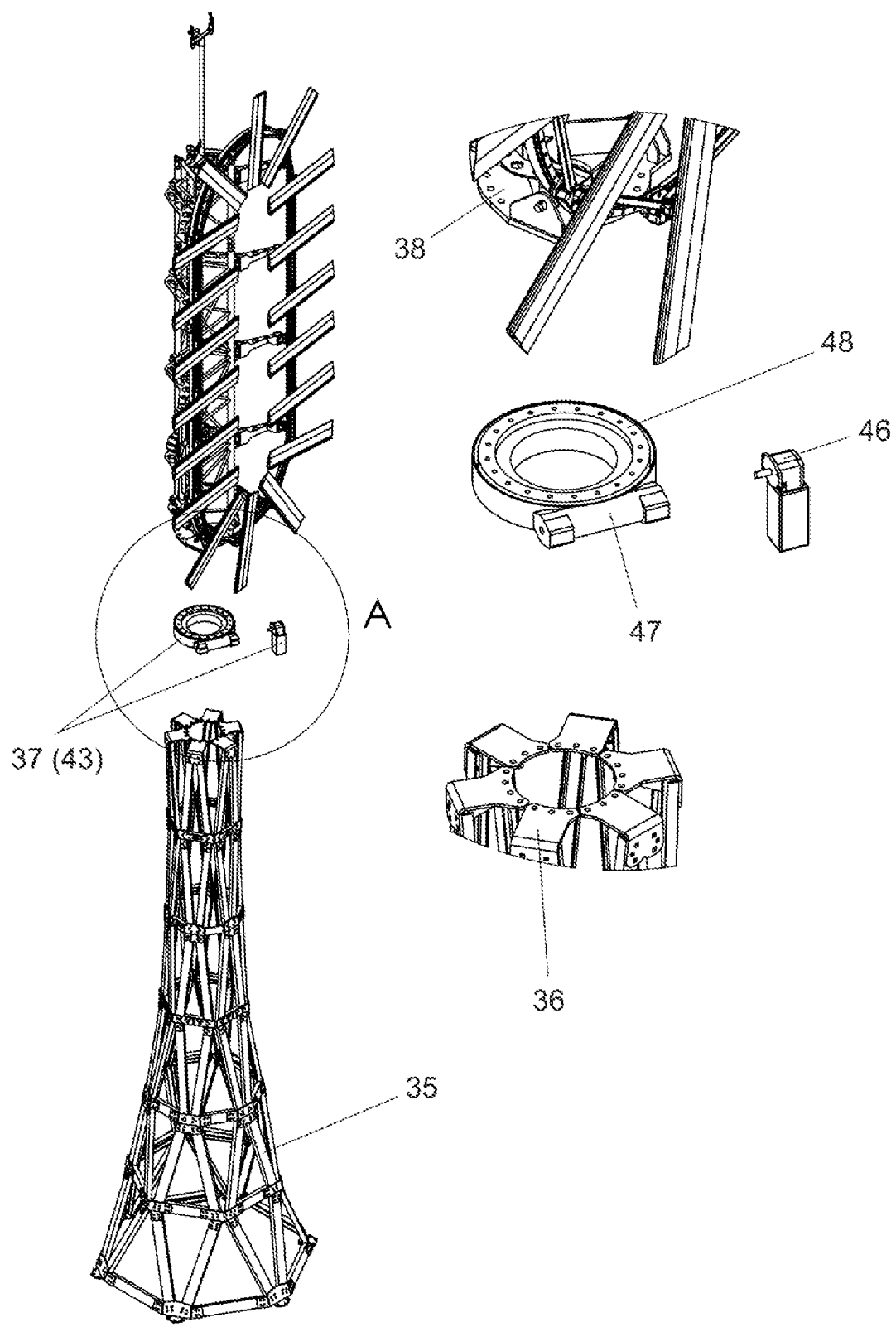
FIG. 12—mast 35, top 36 of mast has a rotation element 37 comprising rotary mechanism 43, and a lower part 38 of the frame 2.

The mast 35 is designed as a vertical support for the wind turbine (FIG. 12). The top 36 of the mast 35 has the build-in rotation element 37 to which is mounted the bottom 38 of the frame 2. The build-in rotation element 37 provides axial rotation of the frame 2 in the range from 0° to 360° (FIG. 12). The mast 35 is rigidly attached to the foundation by any possible means and structural elements.

Figure 11:
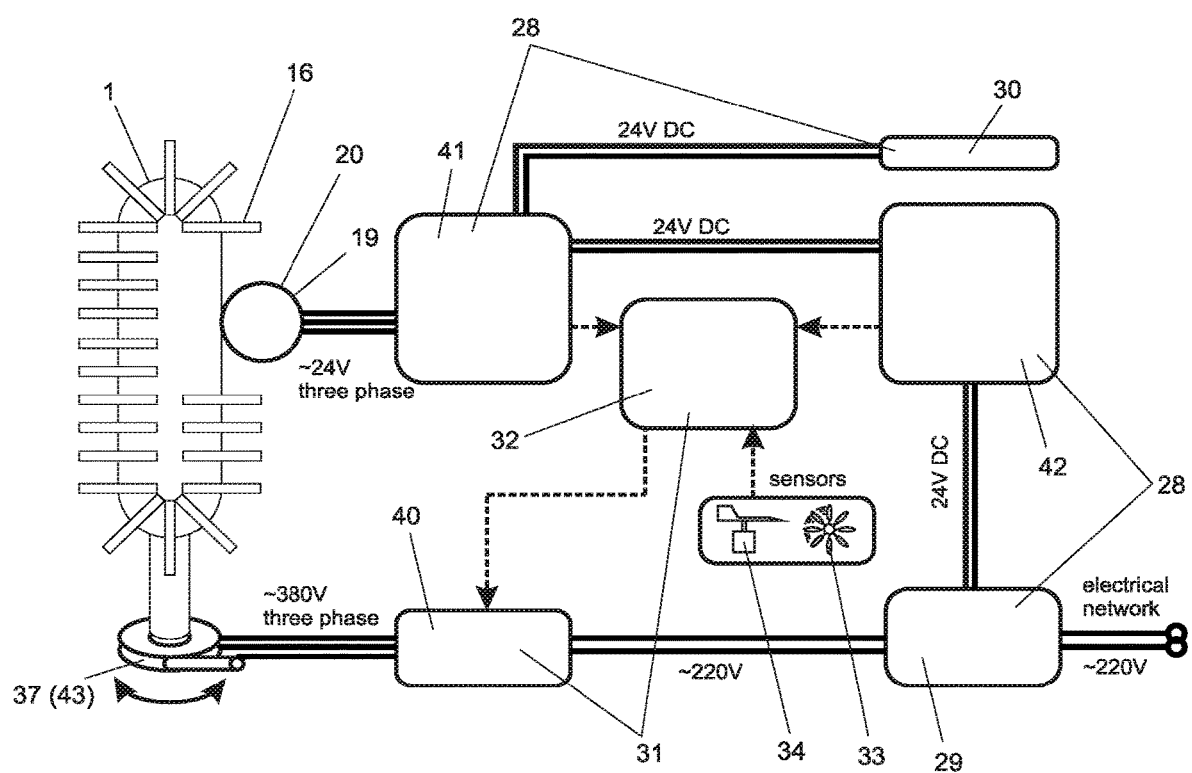
FIG. 11—flowchart: generator block 19, power electronics unit 28, control electronics unit 31.

The rotation element 37 is made in the form of a rotary mechanism 43, which comprises a motor 46, a gearbox 47 and a radial thrust bearing 48 (FIG. 12). The motor 46 is connected to a power supply and has a connection to the rotary controller 32 of the control electronics unit 31 (FIG. 11). The cross-section of the vertical mast 35 may be in the shape of, but not limited to, a circle or polyhedral (FIG. 12), or the shape of the mast 35 may be of a truncated cone.

Figure 9A:
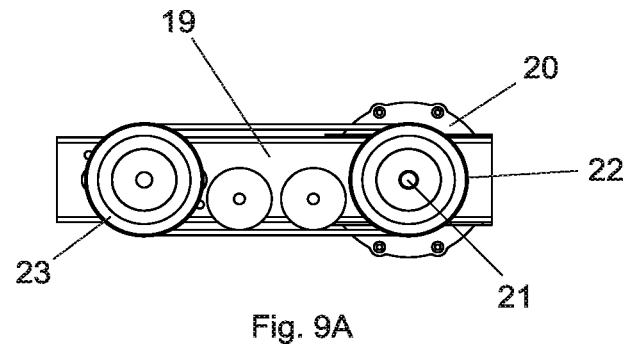
FIG. 9A-C—generator block 19 and its elements (FIGS. 9A, 9B, and 9C show different views)
Figure 9B:
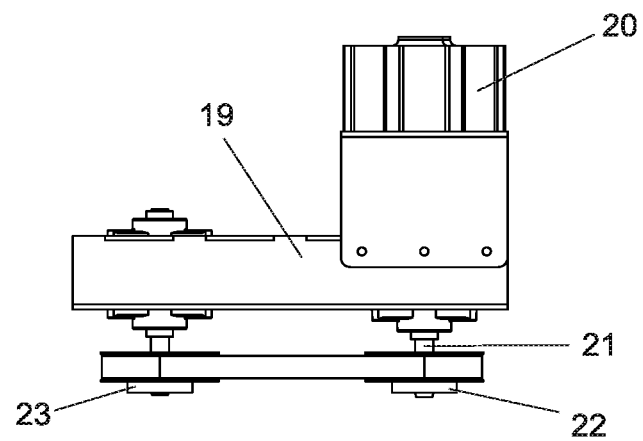
Figure 9C:
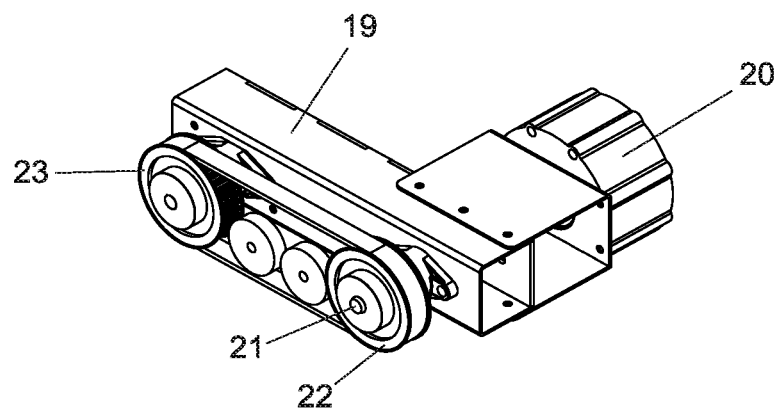

As a part of the wind turbine design, the generator unit 19 (with an electric generator 20) is fixed and mounted on the elliptical base 1 using a mounting rail 27 (FIG. 10). The generator unit 19 comprises a generator 20 on shaft 21 of which a main pulley 22 is placed. Also, the generator set 19 comprises a tension pulley 23, pressure rollers 24, 25, and a belt 26 that encompasses a main pulley 22 and a tension pulley 23 (FIG. 9A-C). The belt 26 alternately contacts the moving connecting rails 13 of the closed circuit 15 by means of pressure rollers 24, 25, which move along the contour of the elliptical base 1 during operation of the device, thus providing receiving/transmitting of mechanical energy in the form of transmitting torque.

The generator 20 is connected to the power electronics unit 28 via the generator controller 41. The power electronics unit 28 consists of at least a power converter (inverter) 29 of the generator controller 41 and a ballast resistance 30 (FIG. 11). The power electronics unit 28 may further comprise a rechargeable battery 42 (FIG. 11).

The wind turbine comprises a control electronics unit 31 based on a rotary controller 32, and a frequency converter 40 may optionally be installed (FIG. 11). The wind turbine also comprises the wind speed sensor 33 and the wind direction sensor 34 (FIG. 11, 15), which are configured and installed to transmit data to the control electronics unit 31.

The control electronics unit 31 is configured so that, based on data from the wind speed sensor 33 and the wind direction sensor 34, its rotary controller 32 provides the necessary (e.g., perpendicular) positioning of the wind turbine direction 2 in relation to the wind direction by controlling the engine 46 of the rotary mechanism 43 of the rotation element 37. Similarly, the control electronics unit 31, together with the engine 46 of the rotary mechanism 43 of the rotation element 37, provide a halt for the operation of the device at a wind speed of more than 18 m/s (storm wind).

As a part of the construction of the invention, various standard connecting elements in the form of bolts, nuts, screws, hinges, and others are provided and used.

The wind generator is installed under natural conditions, and thus certain geophysical data are considered for evaluating air flows.

The elliptical base 1 with the blades 16 can rotate around the vertical axis of the mast 35 in a clockwise or anti-clockwise direction by 360° under the influence of the wind currents. But, in most cases of operation of the wind generator, the elliptical base 1 with blades 16 and together with the frame 2 with the help of a rotary element 37 (swivel mechanism 43) is rigidly stationary on the mast 35 (without the possibility of constant free rotation along the vertical axis) in relation to the wind.

Due to the aerodynamic asymmetrical shape of the blades 16, they form an aerodynamic motion under the action of the force of natural wind flows, and the force of this motion acts on the carriages 7, which are connected into a chain 15. Thus, the chain 15 of carriages 7 cyclically moves along the grooves or along guide rail 3 using rollers 9, 10, 11, and 12. In other words, under the action of the wind currents there is a whirlwind rotation of the circuit 15 with blades 16, which is mechanically transmitted to the generator 20. The generator 20 converts the mechanical energy from the movement of the chain 15 into electrical energy in the standard way. In various individual embodiments of the invention, a classical or linear generator 20 may be used to transmit (convert) mechanical energy into electrical energy.

The rotating part of the generator unit 19, namely the belt 26 which covers the tensioning pulley 23 and the main pulley 22, transmits torque to the shaft 21 of the generator 20. In this case, the belt 26 alternately contacts the moving connecting rails 13 of the closed circuit 15, using pressure rollers 24, 25, which during operation of the device move along the contour of the elliptical base 1 under the action of the blades 16 affected by wind flows. The supply of electricity from the generator 20 to the consumer or energy storage device is carried out in a standard manner through the power electronics unit 28.

During the operation of the wind turbine blades 16 are all radial to the elliptical base 1 (FIG. 1-2) and in the same plane with respect to the wind currents acting on the blades 16. Due to this arrangement of the blades 16, the swept surface area is significantly increased, as compared to known similar technical solutions. When the chain 15 with the blades 16 rotates, the blades 16 describe a semicircle within the contour of the elliptical base 1, with the center of the semicircle located at the inner edge of the blades 16. The centrifugal force acts on the blades 16, with a vector directed from the center of the semicircle within the contour of the elliptical base 1 along each blade 16.

The radius of possible rotation of each blade 16, when fixed to the mounting rail 8 of the carriage 7, is at least one blade length when the blade 16 is positioned and fixed symmetrically in relation to the fixing points. Due to option to mount the blade 16 on the mounting rail 8 of the carriage 7 at, but not limiting to, an angle from 5° to 70°, it is possible to mount the blades 16 with maximum accuracy in relation to existing wind currents. Therefore, it is possible to create much lower loads on the blades 16, spend much less energy for overcoming resistance and possible friction, and minimize "dead zones" of the blades 16, where there is no influence of wind currents on the blades 16.

In the process of movement of the chain 15 with the blades 16 along elliptical base 1, each blade 16 does not change its angle relative to the carriage 7, because the blades 16 are rigidly fixed. This makes it possible to produce an aerodynamic and asymmetric profile of the blade 16 so that to increase the efficiency of wind energy and its conversion into electric power by at least 50-55%.

The design of the novel wind generator with optimal arrangement of its elements, namely, the elliptical base 1 with the guide rail 3, the three-dimensional truss structure 5 of the frame 2 with traverses 6, and connecting elements, provides a smooth chain transmission from the chain 15 formed by the connecting rails 13 of carriages 7 and the blades 16. It also provides reliable fixation and effective arrangement of the blades 16 in space with controlled movement of the blades 16 during operation.

The proposed wind turbine design also ensures that the wind turbine can be put into operation even at low wind speeds.

The combination of all features of the novel wind generator allows to reach the value of the coefficient of conversion of wind energy (CTE) to electricity up to 50-55% due to possibility of increasing the area of swept effective working surface of the blades 16, reduction of the pressure on the effective working surfaces of the blades, and reduction of the "dead" zones of the blades' surfaces.

Increase of the swept effective working surface of the blades 16 is achieved by preliminary regulation of each blade 16, which is represented by an elongated plate with the asymmetrical aerodynamic profile. Since blades 16 are attached to the mounting rails 8 of the carriages 7 with the holders 17, it is possible to preliminary regulate the position of the blades 16 relative to the plane of the elliptical base 1 with angles, for example, from 5° to 70° using the hinges 18 between the blades 16 and the holders 17.

The novel construction further allows continuous cycling the chain 15, comprising carriages 7, connecting rails 13, and rods 14 with the blades 16 along the closed contour of the elliptical base 1, which reduces the load on the working surfaces of the blades 16 and reduces the area of the "dead" zones of the blade surfaces 16.

Due to the original construction of the frame 2 in the form of a three-dimensional truss frame structure 5 with traverses 6, to which the rigid closed elliptical base 1 is attached, the weight of the entire device is significantly reduced, and thus the load on the frame 2 and on the elliptical base 1 is reduced. The aerodynamic drag coefficient of the entire structure is also reduced compared to the known bulky and volumetric structures of known wind generators with a big number of blades.

Due to the design features of the lower part 38 of the three-dimensional truss structure 5 of the frame 2, an effective guaranteed reliable connection of the frame 2 with the top 36 of the mast 35 is achieved (FIG. 12). Due to the original three-dimensional truss construction 5 of frame 2 and traverses 6, an effective guaranteed reliable connection of frame 2 with the elliptical base 1 is achieved. Due to the construction and arrangement of the rotation element 37 in the upper part 36 of the mast 35, the rotation of the elliptical base 1 together with the mounted blades 16 around its vertical axis ranging from 0° to 360° is achieved. These features, together with all other new essential features of the invention, make it possible to effectively use wind flows of any direction and, as a result, to achieve a coefficient of efficiency of wind energy conversion (CTR) of up to 50-55%.

A particular design of the wind turbine structural components, its working elements, their shape and connections ensure the overall functioning of this wind generator design in an optimal way. Operational tests of the wind turbine generator showed an unexpected increase in its efficiency in a wide range of wind speeds and in different ground terrain and mountainous terrain. It is likely that the technical characteristics of each element, the combination of such characteristics, design features in the process of interaction of the components of the device are optimal to achieve this positive result.

Specific structural features, such as the elliptical base 1, the arrangement (fixing) of the blades 16 along its contour, and the corresponding direction of motion of the chain 15 along an elliptical trajectory provide an opportunity to maximize the movement of rollers 9, 10, 11, and 12. The wind currents flowing on the blades 16 with following transmission of the mechanical energy to the carriages 7 with the rollers 9, 10, 11, and 12, accelerates the rollers 9, 10, 11, which allows maximum "acceleration" of the chain 15 with blades 16 and consequently, unexpectedly achieving even greater efficiency of transformation of energy (force) of the wind flow into electrical energy.

Another unexpected result of improved design of the novel wind generator is that the swept area of the blades 16 increases due to the radial positioning of the blades 16 in one plane of the elliptical base 1. During rotation of the elliptical base 1 the blades 16 describe a semicircle along the rounded section of the elliptical base 1, which center is at the internal edge of the blades 16. Thus, the centrifugal force acts on the blades 16, with the vector directed from the center of the semicircle of the elliptical base 1 along each blade 16. A radius of the turn depends on the length of blades 16 and is not less than one length of blade 16, providing that each blade 16 is symmetrical about its attachment points to the mounting rails 8 of carriages 7.

Due to the combination of designed elements of the wind turbine, the rotation of the blades 16 is performed in the optimal regime rather smoothly, without sudden movements, and as a result the blades 16 are subject to significantly lower loads. Furthermore, much less energy is spent on friction and there are no "dead zones" where the blades 16 are not affected by the force of wind currents. Since each blade 16 during the operation of the wind turbine does not change its angle relative to the carriage 7, the angle being set by using hinges 18 at for example, 5° to 70° relative to the plane of the elliptical base 1, it is possible to use the aerodynamic asymmetric profile of blades 16.

The construction of the frame 2 in the form of a three-dimensional truss frame structure 5, the basis of which are vertical racks (mainly pipe elements), is light and at the same time strong due to the stiffeners between the vertical racks. Frame 2 is the supporting base. This reduced the load on the elliptical base 1 with blades 16, which is attached to the frame 2 by means of traverses 6. At the same time, the elliptical base 1 also has a sophisticated design and a relatively light weight, which, together with the frame 2, generally reduces the weight of the entire device, reduces the load on the elliptical base 1, and reduces the drag coefficient of the entire structure.

The control electronics unit 31, which is based on the rotary controller 32, controls the position of the installation perpendicular to the wind direction and stops in a stormy wind. The control electronics unit 31 may comprise a frequency converter 40. A set of sensors, namely a wind speed sensor 33 and a wind direction sensor 34, transmit information to the control electronics unit 31. The power electronics unit 28 in the form of a power converter of the generator controller 41 and the ballast resistance 30 provides for the transfer of generated energy from the generator 20 to the battery 42 or to the electrical network.

The proposed wind turbine generator has been tested under real conditions, and the results of these tests have confirmed that the technical result has been achieved and surpassed the expectations.

The arrangement of the blades 16 in one plane radially along the elliptical contour of the elliptical base 1, in which the guide rail 3 with grooves 4 is installed for rollers 9, 10, 11, and 12, the presence of a three-dimensional truss structure of the frame 2 with traverses 6 to which an elliptical base 1 is attached, a closed circuit 15 of connecting rails 13 and original carriages 7 containing several elements, including at least one pair of rollers 9, 10, 11, and 12, and connected to the brackets 39 carriages 7 through the holders 17 and hinged joints 18 of the blade 16 with an aerodynamic asymmetrical profile, the features of the connecting elements of this structure, the design features of the mast 35 and the attachment to it through the rotation element 37 of the elliptical base 1, the presence of a generator unit 19, the power electronics unit 28 and the control electronics unit 31—all these features together ensure the achievement of superb technical results during the operation of the wind generator.

The achievement of the technical result of the proposed wind turbine generator is enhanced by the following additional features of this device:

The ability to use several guide rails 3 with a round or rectangular cross-section with one or more grooves 4 for rollers 9, 10, 11, and 12 increases the versatility and variability of the device in order to use different numbers of rollers 9, 10, 11, and 12 in the carriages 7 in the manufacture and operation of a structure with different dimensions of the elliptical base 1 and with a different number of blades 16 (to reduce or increase power).

The blades 16 are made of polymer or composite material or of a light metal, such as aluminum or aluminum alloys, reducing the weight of the blades 16 and the mechanical stresses on the structural components.

The cross-section of the vertical mast 35 may have the form of a circle or polyhedral, or the mast is a truncated cone, which increases the versatility and variability of the installation of the device in various environmental conditions.

The execution of a three-dimensional truss frame structure 5 of the frame 2 sectional (modular) allows to reduce or increase the vertical height of the frame 2 (by dismantling or adding vertical sections 45). Also, the elliptical base 1 sectional (modular) construction allows the vertical height of the elliptical base 1 to be reduced or increased by dismantling or adding vertical flat sections 44. Such "sectionality"/modularity provides the ability to change the size of two main elements, change the number of blades 16, and as a result, change the power of the wind generator.

The presence of a frequency converter 40 in the control electronics unit 31 allows the use of various models of the motor 46 in the rotary mechanism 37. The presence of a rechargeable battery 42 allows the power electronics unit 28 to transmit energy to this battery 42.

The rotation element 37, which comprises a motor 46, a gearbox 47, and a radial thrust bearing 48, where the motor 46 is electrically connected and connected to the rotary controller 32 of the control electronics unit 31, allows for efficient control of the position of the frame 2 with an elliptical base 1 and with the blades 16 in relation to the wind direction.

The technical result is achieved by using the wind turbine within the scope of its quantitative characteristics.

The proposed wind turbine generator is sufficiently economical to manufacture and meets all the requirements for its operation. The production of the proposed wind turbine generator will make it possible to extend the range of domestic power plants for use for domestic needs as well as for export.

What is claimed is:

1. A wind generator of variable size and power, comprising:
    a vertical mast (35) rigidly stabilized on a ground, to a top (36) of which is mounted a rotation element (37), with a frame (2) mounted on the rotation element (37) with a frame (2) lower part (38), such that the rotational element (37) provides axial rotation of the frame (2) in a range from 0° to 360°, wherein,
    the frame (2) comprises a three-dimensional truss frame construction (5) with traverses (6), to which at least one rigid closed elliptical base (1) is attached, the at least one elliptical base (1) carrying a guide rail (3) with grooves (4), the guide rail (3) having at least one pair of rollers (9), (10), (11), and (12) installed in the grooves (4), which allows rollers rotation and rolling in the grooves (4) along an entire closed circuit of the elliptical base (1), wherein,
    along an entire contour of the elliptical base (1) the blades (16) are radially fixed and arranged in one plane using carriages (7), and each of the blades (16) is made in a shape of an elongated plate having an aerodynamic asymmetrical profile, wherein, each of the carriages (7) is made of a bracket (39), which is connected to a mounting plate (8) on which installed the at least one pair of rollers (9), (10), (11), and (12), and each of the installed rollers (9), (10), (11), and (12) is capable to rotate around own axis, wherein, holders (17) of the blades (16) are attached to the brackets (39) of the carriages (7), with the blades (16) attached in turn to the holders (17) by hinge connections (18), which allow changing an angle of inclination of the blades (16) with respect to a plane of the elliptical base (1), wherein, each of the carriages (7) is connected to neighboring carriages (7) by connecting rails (13) and rods (14), such that all the carriages (7) connected to each other in series, form a chain carriage of the carriages (7) and the connecting rails (13) as a closed circuit (15), wherein, all the carriages (7) with the attached blades (16) as a part of the closed circuit (15), are installed with their own rollers (9), (10), (11), and (12) in the grooves (4) of the guide (3) elliptical base (1) which allows rotation of the closed circuit (15) with the blades (16) along the closed contour of the elliptical base (1);

a generator block (19), comprising a generator (20) on a shaft (21) of which a main pulley (22) is placed, a tension pulley (23), pressure rollers (24), (25), and a belt (26), wherein, the generator block (19) is installed on its own mounting rail (27), which is mounted on the elliptical base (1) such that the belt (26) alternately contacts the moving connecting rails (13) of the closed circuit (15) using the pressure rollers (24, 25) during operation of the wind generator, thus allowing to receive/transmit mechanical energy, wherein, the generator (20) has a connection via a generator controller (41) to a power unit electronics (28), which comprises at least a power converter (29) of the controller generator (41) and ballast resistance (30);

a control electronics unit (31) based on a rotary controller (32), and a wind speed sensor (33) and a wind direction sensor (34) for data transmission to the control electronics unit (31), which is configured to transmit control signals to the rotation element (37) to ensure a necessary location of the frame (2) of the wind generator in relation to a wind direction based on obtained data, and for providing a halt of the wind generator when a wind speed exceeds 18 m/s.

2. The wind generator of claim 1, wherein the elliptical base (1) comprises more than one guide rail (3) for carriages (7), and wherein the guide rails (3) have a round or a rectangular cross-section with one or more grooves (4) for the rollers (9), (10), (11), (12).

3. The wind generator of claim 1, wherein the blades (16) are made of any of polymeric material, composite material, aluminum or aluminum alloys.

4. The wind generator of claim 1, wherein a cross-section of the vertical mast (35) is a circle, or a polyhedral, or wherein the vertical mast (35) is a truncated cone.

5. The wind generator of claim 1, wherein the three-dimensional truss frame construction (5) is made of sections which provides an option to reduce or increase a vertical height of the frame (2) by dismantling or adding vertical sections (45).

6. The wind generator of claim 1, wherein the elliptical base (1) is made of sections which provides an option to reduce or increase a vertical height of the elliptical base (1) by dismantling or adding vertical flat sections (44).

7. The wind generator of claim 1, wherein the control electronics unit (31) comprises a frequency converter (40).

8. The wind generator of claim 1, wherein the power electronics unit (28) comprises a rechargeable battery (42).

9. The wind generator of claim 1, wherein the rotation element (37) is in a form of a rotary mechanism (43), which comprises at least a motor (46), a gearbox (47) and a radial thrust bearing (48), wherein the rotation element (37) is installed on the top (36) of the vertical mast (35) at a junction of the frame (2) and the vertical mast (35), and wherein the motor (46) is connected to a power supply and to the rotary controller (32) of the control electronics unit (31).

* * * * *